(12) United States Patent
Kitade

(10) Patent No.: US 6,907,014 B1
(45) Date of Patent: Jun. 14, 2005

(54) APPARATUS AND METHOD FOR TDMA-TDD BASED TRANSMISSION/RECEPTION

(75) Inventor: Takashi Kitade, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 703 days.

(21) Appl. No.: 09/693,839

(22) Filed: Oct. 23, 2000

(30) Foreign Application Priority Data

Oct. 29, 1999 (JP) .......................................... H11-309229

(51) Int. Cl.[7] .................................................. H04J 3/00
(52) U.S. Cl. ........................... 370/280; 370/345; 455/73
(58) Field of Search ................................. 370/280, 310, 370/321, 329, 344, 333, 336, 337, 339, 347, 442, 276, 277, 332, 334, 326, 335, 345, 328, 341, 431, 331, 294; 455/437, 442, 443, 436, 525, 562, 101, 73

(56) References Cited

U.S. PATENT DOCUMENTS

| | | | | |
|---|---|---|---|---|
| 5,598,404 A | * | 1/1997 | Hayashi et al. ............. | 370/342 |
| 5,628,052 A | * | 5/1997 | DeSantis et al. ......... | 455/562.1 |
| 5,648,955 A | | 7/1997 | Jensen et al. | |
| 5,748,621 A | | 5/1998 | Masuda et al. | |
| 5,768,264 A | * | 6/1998 | Anderson et al. ........... | 370/280 |
| 5,787,076 A | * | 7/1998 | Anderson et al. ........... | 370/294 |
| 5,818,820 A | * | 10/1998 | Anderson et al. ........... | 370/280 |
| 5,844,894 A | * | 12/1998 | Dent .......................... | 370/330 |
| 5,844,898 A | | 12/1998 | Tanoue | |
| 6,005,854 A | * | 12/1999 | Xu et al. .................... | 370/335 |
| RE36,591 E | * | 2/2000 | Hayashi et al. ............. | 370/342 |
| 6,031,827 A | * | 2/2000 | Rikkinen et al. ........... | 370/330 |
| 6,088,590 A | * | 7/2000 | Anderson et al. ........... | 455/437 |
| 6,122,260 A | * | 9/2000 | Liu et al. .................... | 370/280 |
| 6,130,886 A | * | 10/2000 | Ketseoglou et al. ........ | 370/347 |
| 6,144,650 A | * | 11/2000 | Watanabe et al. ........... | 370/335 |
| 6,229,792 B1 | * | 5/2001 | Anderson et al. ........... | 370/280 |
| 6,229,796 B1 | * | 5/2001 | Dent .......................... | 370/335 |
| 6,272,121 B1 | * | 8/2001 | Smith et al. ................ | 370/342 |
| 6,281,840 B1 | * | 8/2001 | Miyoshi et al. ............. | 342/374 |
| 6,301,242 B1 | * | 10/2001 | Lindsay et al. ............. | 370/347 |
| 6,650,630 B1 | * | 11/2003 | Haartsen ..................... | 370/345 |

FOREIGN PATENT DOCUMENTS

| | | |
|---|---|---|
| EP | 0936751 | 8/1999 |
| JP | 11122654 | 4/1999 |
| KR | 00232669 | 9/1999 |
| WO | 9708911 | 3/1997 |
| WO | 9731503 | 8/1997 |

OTHER PUBLICATIONS

European Office Action dated Aug. 13, 2004.

* cited by examiner

*Primary Examiner*—Wellington Chin
*Assistant Examiner*—Jamal A. Fox
(74) *Attorney, Agent, or Firm*—Stevens, Davis, Miller & Mosher, LLP

(57) ABSTRACT

Despreading section 203 extracts a common control channel signal from each base station by performing despreading processing on a baseband signal from RF section 202 using a predetermined spreading code. Propagation loss measuring section 206 measures a propagation loss for each base station using the reception level of the common control channel signal and the transmission level of this common control channel signal. Propagation loss comparator 207 detects a base station whose propagation loss is a minimum from among all base stations. Transmission data control section 208 controls the timing of transmission data in the data composition section so that an dedicated traffic channel signal is transmitted to the detected base station and controls the spreading code in spreading section 211.

6 Claims, 7 Drawing Sheets

APPARATUS AND METHOD FOR TDMA-TDD BASED TRANSMISSION/RECEPTION

BACKGROUND OF THE INVENTION

1. Field of the Invention

The present invention relates to a transmission/reception apparatus and transmission/reception method that carries out handover in a communication system according to a TDMA (Time Division Multiple Access)-TDD (Time Division Duplex) system, and more particularly, to a transmission/reception apparatus and transmission/reception method that carries out handover in a communication system in which a plurality of user signals are multiplexed on time slots according to a CDMA (Code Division Multiple Access) system or OFDM (Orthogonal Frequency Division Multiplexing) system, etc.

2. Description of the Related Art

As multiple access technologies for radio communications such as car phones and cellular phones, a TDMA system, CDMA system and OFDM system, etc. are used. The TDMA system is a system in which users communicate with each other by dividing a time. The CDMA system is a system in which a plurality of users share a same frequency or same time and communicate with each other by separating each user's signal using an orthogonal spreading code.

Furthermore, as a system of multiplexing downlink (channel through which a base station transmits a signal to a mobile station) and uplink (a channel through which a mobile station transmits a signal to a base station), a TDD system and FDD (Frequency Division Duplex) system are available. The TDD system is a system of multiplexing the downlink and uplink in a same frequency band. The FDD system is a system of multiplexing the downlink and uplink in different frequencies on a same time.

In the TDD system in particular, a same frequency is assigned to transmission and reception, that is, a same frequency is assigned to the downlink and uplink, and therefore a frequency correlation of fading fluctuations between a transmission signal and reception signal in a base station and mobile station is 1. Furthermore, in the case where the cycle of switching between the uplink and downlink is sufficiently short, a time correlation between the downlink and uplink of the propagation condition such as fading fluctuations increases.

In a cellular system, handover is generally carried out. According to FIG. 1, when mobile station 11 moves, for example, from the area of base station (A) 12 to the area of base station (B) 13, handover is a technology for switching the traffic channel handled by base station (A) 12 to the base station (B) 13. There are two kinds of method for carrying out handover; soft handover and hard handover.

Soft handover is mainly applied to a CDMA system and is a method for switching traffic channels as described below. That is, when handover takes place, the traffic channel handled by base station (A) 12 and the traffic channel handled by base station (B) 13 are simultaneously maintained for mobile station 11 and then the traffic channel used by mobile station 11 is changed to the traffic channel handled by base station (B) 13 only. This soft handover can reduce a possibility that the traffic channel will be down during handover.

On the other hand, hard handover is mainly applied to a TDMA system or a communication using packet transmission and is a method for switching traffic channels as described below. That is, hard handover is a method that does not allow mobile station 11 to use the traffic channel handled by base station (A) 12 and the traffic channel handled by base station (B) 13 simultaneously, and changes from the traffic channel handled by base station (A) 12 to the traffic channel handled by base station (B) 13 at certain timing.

The operations of the base station and mobile station when these two kinds of handover are used in a TDMA-TDD based communication will be explained with reference to FIG. 2 and FIG. 3. Here, a case where a CDMA system is used as the method of multiplexing signals of a plurality of users in each time slot will be explained. As shown in FIG. 1, suppose mobile station 11 moves from the area of base station (A) 12 to the area of base station (B) 13.

First, the case where soft handover is used will be explained with reference to FIG. 2. FIG. 2A to FIG. 2E are schematic diagrams showing an example of state transition of time slot assignment in execution of soft handover in a conventional TDMA-TDD based communication.

As shown in FIG. 2A, before handover takes place, a downlink traffic channel used for transmission from base station (A) 12 to each mobile station (including mobile station 11) is assigned to time slot (hereinafter referred to as "TS") 21 in a frame and an uplink traffic channel used for transmission from the above mobile station to base station (A) 12 is assigned to TS22 in the frame.

When handover starts, as shown in FIG. 2B, a downlink traffic channel used for transmission from base station (B) 13 to mobile station 11 is assigned to TS23 in the frame. At this time, mobile station 11 combines the signal received over the downlink from base station (A) 12 and the signal received over the downlink from base station (B) 13.

Then, as shown in FIG. 2C, an uplink traffic channel used for transmission from mobile station 11 to base station (B) 13 is assigned to TS24 in the frame. At this TS24, mobile station 11 transmits a signal to base station (B) 13 and base station (B) 13 receives the signal from mobile station 11.

When mobile station 11 enters the area of base station (B) 13 completely, as shown in FIG. 2D, mobile station 11 stops transmission to base station (A) 12, which was carried out at TS22. Then, as shown in FIG. 2E, base station (A) 12 stops transmission to mobile station 11, which was carried out at TS21. In this way, handover is completed.

Then, a case where hard handover is used will be explained with reference to FIG. 3. FIG. 3A and FIG. 3B are schematic diagrams showing an example of state transition of time slot assignment in execution of hard handover in the conventional TDMA-TDD based communication.

As shown in FIG. 3A, before handover takes place, the state of assignment of time slots in the frame is the same as that in the case of soft handover described above (FIG. 2A).

Then, triggered at certain timing while mobile station 11 is moving from the area of base station (A) 12 to the area of base station (B) 13, the state of time slots in the frame is changed from the state shown in FIG. 3A to the state shown in FIG. 3B.

That is, base station (A) 12 stops transmission to mobile station 11, which was carried out at TS31 and base station (B) 13 starts transmission to mobile station 11 at TS33. Moreover, mobile station 11 stops transmission to base station (A) 12, which was carried out at TS32 and starts transmission to base station (B) 13 at TS34. In this way, handover is completed.

However, the conventional TDMA-TDD based communication using handover has the following problems: First, when soft handover is used, each mobile station uses traffic channels handled by a plurality of base stations (a plurality of parties on the other end of communication) simultaneously during handover, and this means that transmission is carried out at time slots corresponding in number with the base stations above for each frame.

Because of this, current consumption at each mobile station increases and at the same time interference by a transmission signal of each mobile station with base stations other than the base stations above (base stations that are not communication targets) using the same time slots as those described above increases. To suppress influences of this interference, it is necessary to reduce the number of mobile stations to be multiplexed on the time slots above. This results in a reduction of the system capacity.

On the other hand, when hard handover is used, unlike the case where soft handover is used, each mobile station performs transmission using only a traffic channel handled by one base station all the time, and therefore it is possible to equalize current consumption at each mobile station and interference with the other base stations above to current consumption and interference for any time (during a normal communication) other than a handover period.

However, in the case where a mobile station is near areas of a plurality of base stations, or more specifically, the mobile station is on the boundary between the area of base station (A) 12 and the area of base station (B) 13 in FIG. 1, the level of the reception signal from base station (A) 12 and the level of the reception signal from base station (B) 13 may be balanced and the level of the reception signal may be small. In such a case, switching of hard handover often takes place, which increases the possibility that calls made by the mobile station will be down.

SUMMARY OF THE INVENTION

It is an object of the present invention to provide a TDMA-TDD based transmission/reception apparatus capable of suppressing current consumption and interference with base stations other than communication targets and executing handover without causing interruption of calls. This object is attained by selecting the base station to be the transmission destination from among a plurality of base stations in the process of handover based on the propagation conditions for the plurality of base stations and transmitting a signal only to the selected base station.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the present invention will be explained in detail below.

(Embodiment 1)

Figure 1:
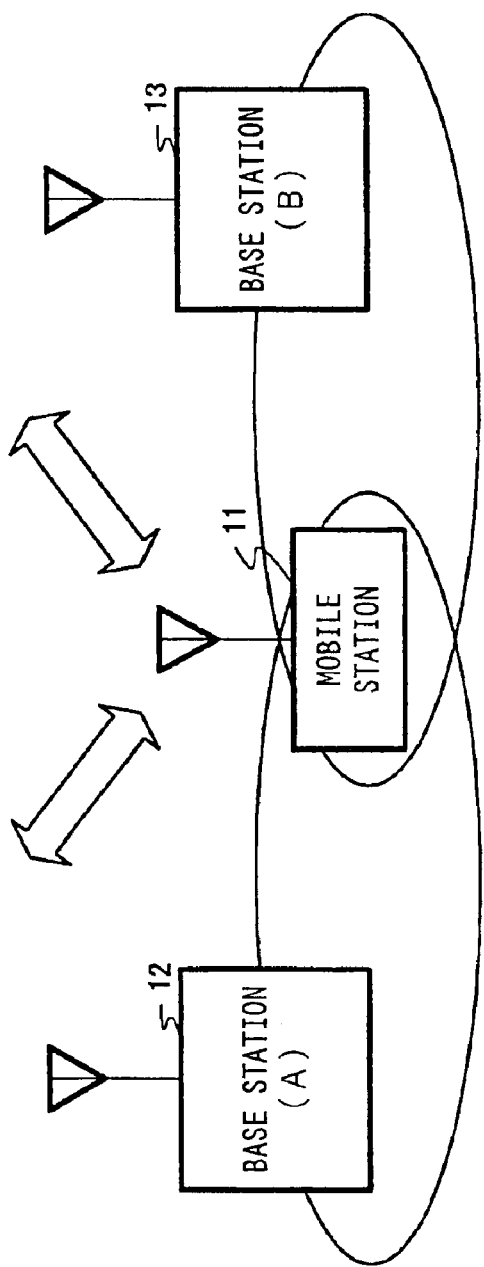
FIG. 1 is a schematic diagram showing a radio communication carried out by a mobile station equipped with a conventional transmission/reception apparatus.
Figure 2:
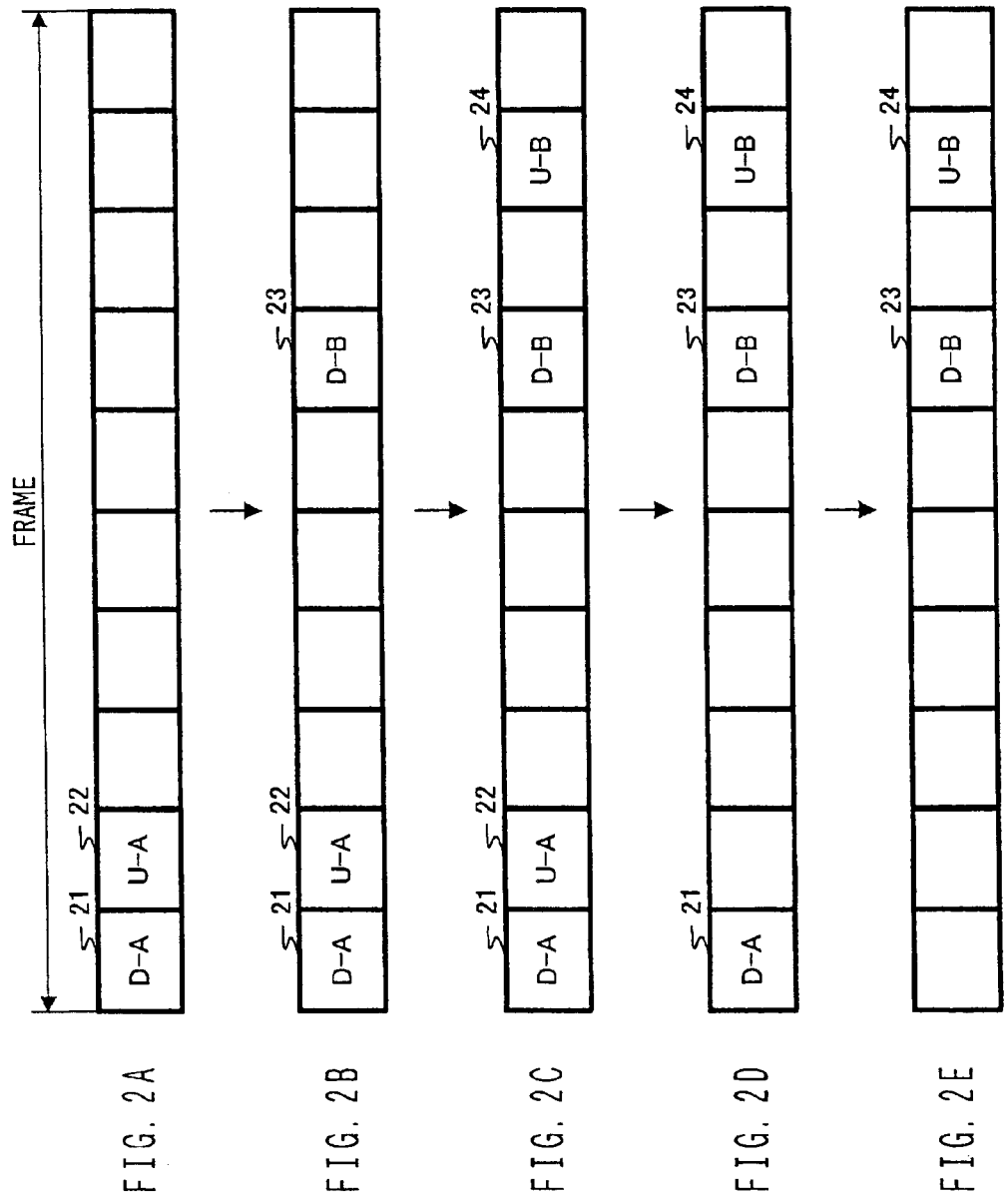
FIG. 2A is a schematic diagram showing an example of state transition of time slot assignment in execution of soft handover in a conventional TDMA-TDD based communication.
FIG. 2B is a schematic diagrams showing an example of state transition of time slot assignment in execution of soft handover in a conventional TDMA-TDD based communication.
FIG. 2C is a schematic diagrams showing an example of state transition of time slot assignment in execution of soft handover in a conventional TDMA-TDD based communication.
FIG. 2D is a schematic diagrams showing an example of state transition of time slot assignment in execution of soft handover in a conventional TDMA-TDD based communication.
FIG. 2E is a schematic diagrams showing an example of state transition of time slot assignment in execution of soft handover in a conventional TDMA-TDD based communication.
Figure 3:
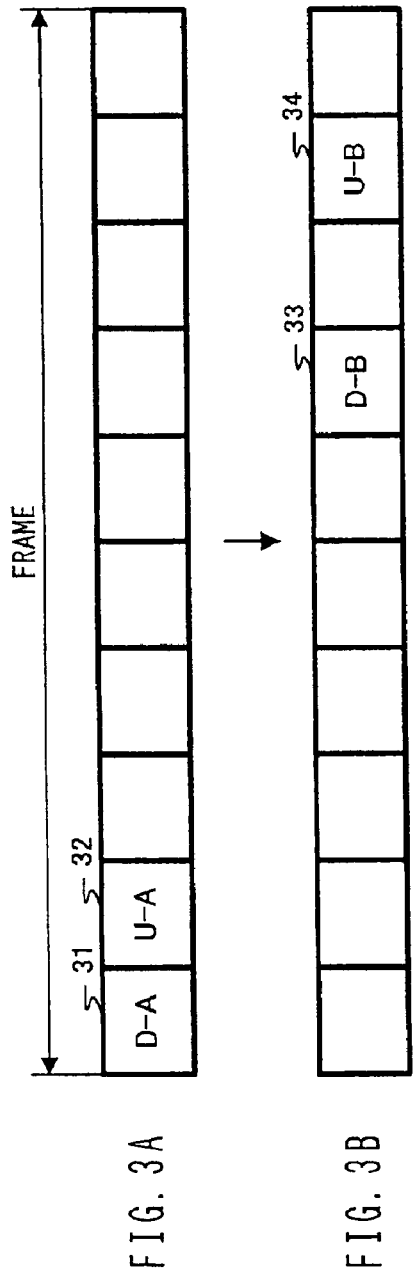
FIG. 3A is a schematic diagram showing an example of state transition of time slot assignment in execution of hard handover in the conventional TDMA-TDD based communication.
FIG. 3B is a schematic diagram showing an example of state transition of time slot assignment in execution of hard handover in the conventional TDMA-TDD based communication.
Figure 4:
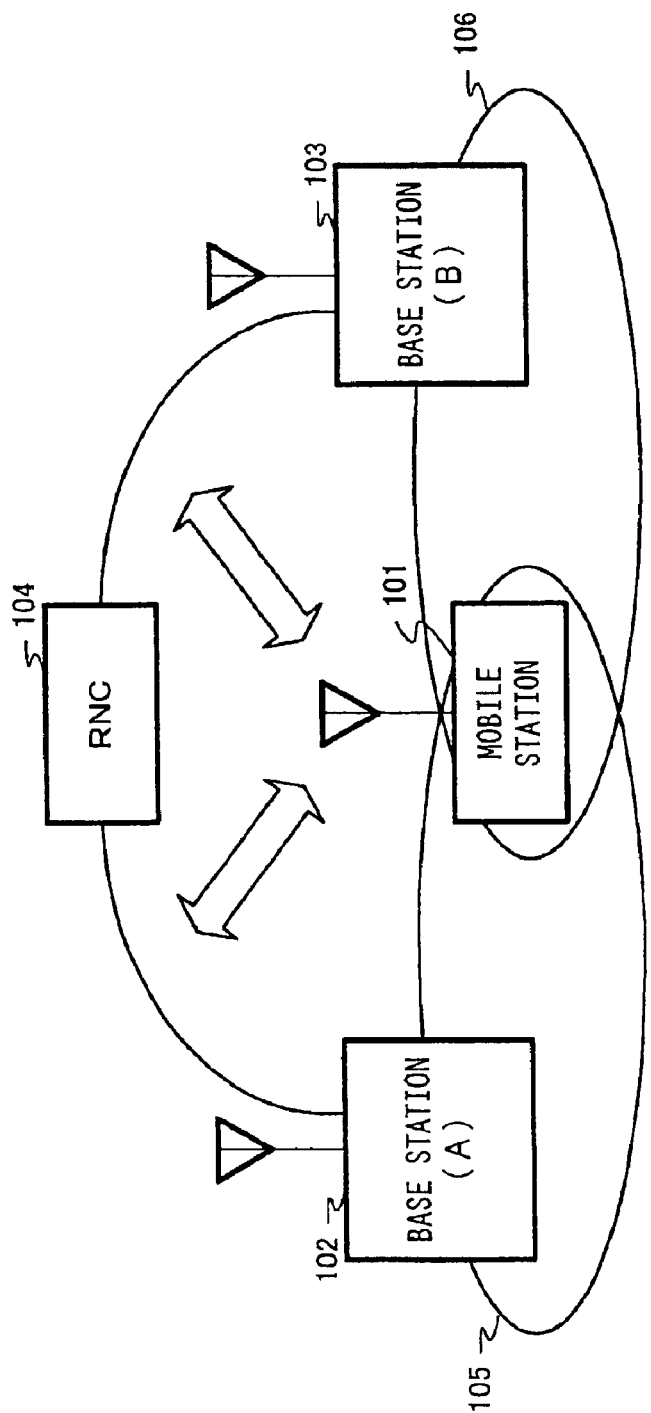
FIG. 4 is a schematic diagram showing a radio communication carried out by a mobile station equipped with a transmission/reception apparatus according to Embodiment 1 of the present invention.

First, an overview of the transmission/reception apparatus according to this embodiment will be explained with reference to FIG. 4 taking a case where this transmission/reception apparatus is mounted on a mobile station as an example. FIG. 4 is a schematic diagram showing a radio communication carried out by a mobile station equipped with the transmission/reception apparatus according to Embodiment 1 of the present invention. FIG. 4 shows how mobile station 101 equipped with the transmission/reception apparatus according to this embodiment moves from area 105 of base station (A) 102 to area 106 of base station (B) 103.

Each mobile station (mobile station 101 in FIG. 4) and each base station (base station (A) 102 and base station (B) 103 in FIG. 4) carry out a TDMA-TDD based radio communication. Each mobile station and each base station carry out a communication using dedicated traffic channels at predetermined time slots in a frame. Hereinafter, for brevity of explanation, a signal that the mobile station transmits to the base station using a dedicated traffic or a signal that the base station transmits to the mobile station using a dedicated traffic channel will be referred to as "dedicated traffic channel signal."

Aside from a communication using the dedicated traffic channel, each base station transmits various control signals for each frame using a common control channel. That is, each base station almost always transmits a common control channel signal to each mobile station. Hereinafter, for brevity of explanation, a signal that the base station transmits to the mobile station using the common control channel will be referred to as "common control channel signal." In order to establish synchronization with the base station, each mobile station receives a common control channel signal transmitted from each base station.

Each mobile station receives and stores the transmission level of a common control channel signal transmitted almost always from each base station through a broadcast channel, for example, of the common control channels. Moreover, each mobile station calculates and compares a loss in propagation from each base station using the reception level and transmission level of common control channel signals almost always transmitted from each base station and detects the base station whose propagation loss is a minimum. That is, mobile station 101 here calculates and compares a propagation loss from the reception level of common control channel signals almost always transmitted from base station (A) 102 and the reception level of common control channel signals almost always transmitted from base station (B) 103 and detects which of the base stations above has a smaller propagation loss.

The common control channel signal at each base station is transmitted to each mobile station is always transmitted with constant power. For this reason, by using the reception level and transmission level of common control channel signals from base station (A) 102 and base station (B) 103, mobile station 101 can estimate the propagation condition used when each base station transmitted a common control channel signal to mobile station 101.

As described above, since each mobile station and each base station perform a TDD-based radio communication, the propagation conditions used when base station (A) 102 and base station (B) 103 transmitted a common control channel signal to mobile station 101 have a high correlation with the conditions of propagation paths used when mobile station 101 transmits dedicated traffic channel signals to base station (A) 102 and base station (B) 103, respectively.

Therefore, mobile station 101 can estimate the propagation condition when an dedicated traffic channel signal is transmitted to each base station by detecting the reception level of a common control channel signal from each base station, calculating and comparing a propagation loss.

During handover, mobile station 101 only transmits an dedicated traffic channel signal to the base station (here, base station (B) 103) whose propagation loss detected from the reception level of the common control channel signal is smallest. This allows mobile station 101 to select the base station that can have an optimal propagation path as the transmission destination of the dedicated traffic channel signal, that is, the optimal base station.

After this, base station (B) 103 that has received the dedicated traffic channel signal from mobile station 101 transmits an dedicated traffic channel signal to mobile station 101 using a predetermined time slot. Of the other base stations, the base station (here base station (A) 102) that was performing transmission to mobile station 101 via a downlink dedicated traffic channel stops transmission of the dedicated traffic channel signal to mobile station 101. This is an overview of the transmission/reception apparatus according to this embodiment.

Figure 5:
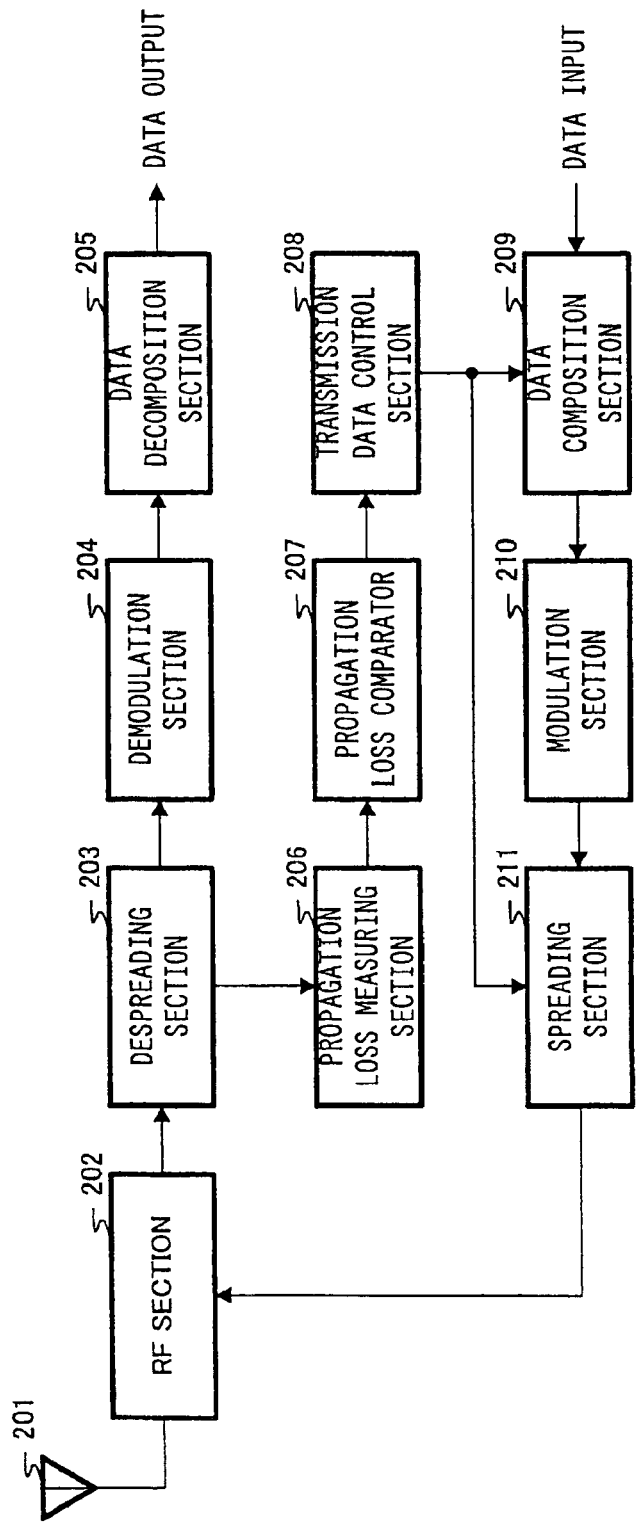
FIG. 5 is a block diagram showing a configuration of the mobile station equipped with the transmission/reception apparatus according to Embodiment 1 of the present invention.

Next, the mobile station equipped with the transmission/reception apparatus according to this embodiment described above will be explained with reference to FIG. 5. FIG. 5 is a block diagram showing a configuration of the mobile station equipped with the transmission/reception apparatus according to Embodiment 1 of the present invention.

According to FIG. 5, a signal received via antenna 201 (reception signal) is converted from an RF signal to a baseband signal by RF section 202. This reception signal is mainly a signal of a common control channel signal of each base station multiplexed with an dedicated traffic channel signal of the base station in the process of handover on a same frequency band.

The baseband signal from RF section 202 is subjected to despreading processing by despreading section 203. More specifically, the baseband signal above is subjected to despreading processing using a spreading code corresponding to each base station and thereby a common control channel signal of each base station is extracted. Here, the spreading code corresponding to each base station corresponds to a spreading code used for spreading processing before transmission of the common control channel signal on each base station side described above. This despreading processing is carried out for every frame, that is, carried out almost always. The extracted common control channel signal of each base station is sent to propagation loss measuring section 206.

The baseband signal above is subjected to despreading processing using a spreading code assigned to this mobile station and thereby the dedicated traffic channel signal corresponding to this mobile station transmitted from the base station in the process of handover is extracted. This despreading processing is carried out at a predetermined time slot in the frame. The predetermined time slot will be described later. The extracted dedicated traffic channel signal is transmitted to demodulation section 204.

In demodulation section 204, the extracted dedicated traffic channel signal is demodulated and data is obtained, which is configured on a frame-by-frame basis. However, in execution of handover, that is, when despreading processing is carried out in a plurality of time slots by despreading section 203, in demodulation section 204, the dedicated traffic channels extracted in the above plurality of time slots are combined and data is obtained, which is configured on a frame-by-frame basis. Data configured on a frame-by-frame basis is decomposed and output by data decomposition section 205.

On the other hand, propagation loss measuring section 206 extracts and stores information on the transmission level of the common control channel signal of each base station from among common control channel signals of base stations sent from despreading section 203. Each base station can transmit the transmission level of a common control channel signal by means of this common control channel signal (e.g., broadcast channel signal). Moreover, after measuring the reception level of a common control channel signal of each base station, propagation loss measuring section 206 measures a propagation loss for each base station from the stored transmission level of the common control channel signal and measured reception level of this common control channel signal. The measurement result is sent to propagation loss comparator 207.

Propagation loss comparator 207 detects the base station with the least propagation loss from all base stations in the process of handover based on the measurement result above. The detection result is sent to transmission data control section 208.

Transmission data control section 208 generates a control signal indicating that an dedicated traffic channel signal will be transmitted to a predetermined base station. More specifically, in execution of handover, transmission data control section 208 generates a control signal indicating that an dedicated traffic channel signal will be transmitted to the base station whose propagation loss is a minimum based on the detection result above by propagation loss comparator 207. In any time period other than a handover execution period (during a normal communication), transmission data control section 208 generates a control signal indicating that an dedicated traffic channel signal will be transmitted to the base station, which has Seen considered to be the transmission destination of the dedicated traffic channel signal so far. The control signal generated is sent to data composition section 209 and spreading section 211.

Data composition section 209 composes data configured frame by frame using transmission data based on the control signal from transmission data control section 208. In execution of handover, the timing (slot position) of the transmission data is controlled so that the dedicated traffic channel signal is transmitted to the base station detected by propagation loss comparator 207. During a normal communication, the timing of the transmission data is controlled so that an dedicated traffic channel signal is transmitted to the base station, which has been considered to be the transmission destination of dedicated traffic channel signals so far.

The data composed frame by frame by data composition section 209 is subjected to primary modulation according to a predetermined modulation system by modulation section 210. The primary-modulated data is sent to spreading section 211.

Spreading section 211 performs spreading processing on the primary-modulated data based on a control signal from transmission data control section 208. In execution of handover, a spreading code to be used for spreading processing is controlled so that an dedicated traffic channel signal is transmitted to the base station detected by propagation loss comparator 207. During a normal communication, a spreading code to be used for spreading processing is controlled so that an dedicated traffic channel signal is transmitted to the base station considered to be the transmission destination of the dedicated traffic channel signal so far.

The signal subjected to spreading processing by spreading section 211 is converted from a base band signal to an RF signal by RF section 202. This RF signal is transmitted to the base station detected above via antenna 201 as an dedicated traffic channel signal.

Figure 6:
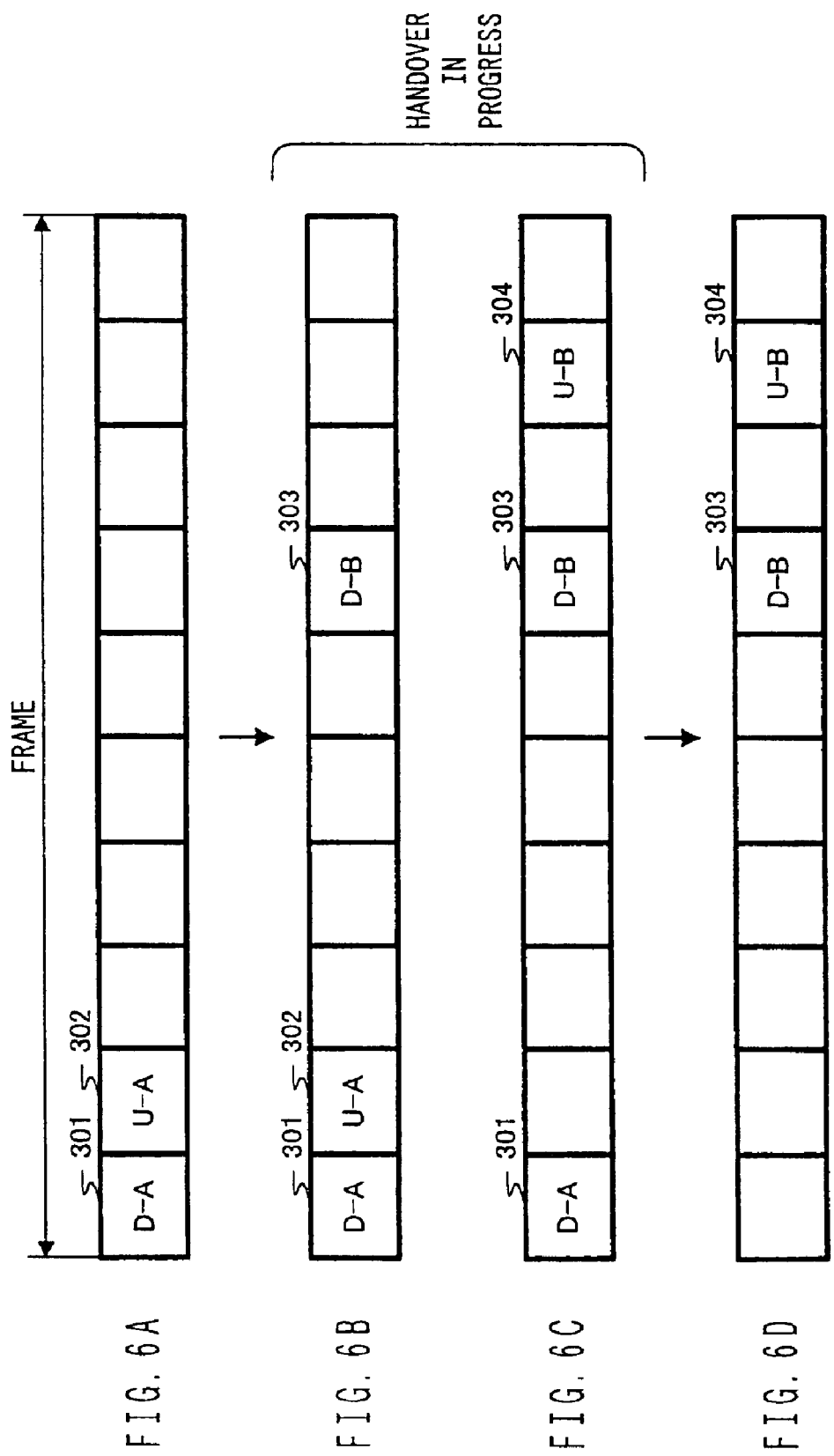
FIG. 6A is a schematic diagram showing an example of the state of time slots assigned to the mobile station equipped with the transmission/reception apparatus according to Embodiment 1 of the present invention and a base station that carries out a radio communication with this mobile station.
FIG. 6B is a schematic diagram showing an example of the state of time slots assigned to the mobile station equipped with the transmission/reception apparatus according to Embodiment 1 of the present invention and a base station that carries out a radio communication with this mobile station.
FIG. 6C is a schematic diagram showing an example of the state of time slots assigned to the mobile station equipped with the transmission/reception apparatus according to Embodiment 1 of the present invention and a base station that carries out a radio communication with this mobile station.
FIG. 6D is a schematic diagram showing an example of the state of time slots assigned to the mobile station equipped with the transmission/reception apparatus according to Embodiment 1 of the present invention and a base station that carries out a radio communication with this mobile station.

Then, the operation of the mobile station equipped with the transmission/reception apparatus according to this embodiment will be explained with reference to FIG. 6 as well as FIG. 4 and FIG. 5. The explanation below assumes, as shown in FIG. 4, that mobile station 101 first moves from area 105 of base station (A) 102 to area 106 of base station (B) 103.

FIG. 6A to FIG. 6D are schematic diagrams showing an example of the state of time slots assigned to the mobile station equipped with the transmission/reception apparatus according to Embodiment 1 and the base stations that carry out a radio communication with this mobile station.

Suppose mobile station 101 is located in area 105 first. At this time, as shown in FIG. 6A, time slot (hereinafter referred to as "TS") 301 in a frame is assigned a channel for base station (A) 102 to transmit a common control channel signal to each mobile station including mobile station 101 and to transmit an dedicated traffic channel signal to mobile stations that belong to this base station (A) 102 and TS302 is assigned a channel for the mobile stations that belong to base station (A) 102 to transmit an dedicated traffic channel signal to this base station (A) 102.

The system of multiplexing dedicated traffic channel signals to each mobile station in TS301 and the system of multiplexing dedicated traffic channel signals from each mobile station to base station (A) 102 in TS302, that is, the case where a CDMA system is used as the system of multiplexing signals at time slots in the frame will be explained. However, the multiplexing system is not limited to the CDMA system.

According to FIG. 6A, in TS301, base station (A) 102 transmits an dedicated traffic channel signal to each mobile station that belongs to this base station (A) 102 and mobile station 101 receives the dedicated traffic channel signal transmitted from base station (A) 102.

On the other hand, as described above, each base station (base station (A) 102 and base station (B) 103 in FIG. 4) transmits a common control channel signal for every frame, that is, almost always transmits a common control channel signal. That is, base station (A) 102 transmits a common control channel signal for every frame using TS301 shown in FIG. 6A and base station (B) 103 transmits a common control channel signal for every frame using any TS in the frame shown in FIG. 6A. Upon receipt of a command for measuring the reception level from base station (here base station (A) 102), mobile station 101 measures the reception level of these common control channel signals and reports the reception level to the base station above.

In TS302, mobile station 101 transmits an dedicated traffic channel signal to base station (A) 102. Base station (A) 102 receives dedicated traffic channel signals from mobile stations that belong to this base station (A) 102 including mobile station 101.

Then, mobile station 101 moves toward base station (B) 103 and suppose the reception level of the common control channel signal of base station (B) 103 at mobile station 101 exceeds the reception level of the common control channel signal of base station (A) 102.

In this case, base station (A) 102 decides whether mobile station 101 needs to perform handover to base station (B) 103 or not, and if necessary, base station (A) 102 transmits a command for starting handover to mobile station 101. In this way, handover is executed.

In execution of handover, as shown in FIG. 6B, TS303 is assigned a channel for base station (B) 103 to transmit an dedicated traffic channel signal to mobile station 101. In this way, base station (B) 103 transmits an dedicated traffic channel signal to mobile station 101.

In TS303, base station (B) 103 transmits an dedicated traffic channel signal to mobile station 101 and mobile station 101 receives the dedicated traffic channel signal transmitted from base station (B) 103. That is, in execution of handover, mobile station 101 receives an dedicated traffic channel signal from base station (A) 102 and an dedicated traffic channel signal from base station (B) 103.

The operations of mobile station 101 and base station (A) 102 in TS301 and TS302 in FIG. 6B are the same as those described above.

As described above, mobile station 101 measures and compares a propagation loss of each base station for every frame, that is, almost always.

Here, in the case where the propagation loss of base station (A) 102 is smaller than the propagation loss of base station (B) 103, propagation loss comparator 207 detects base station (A) 102 as the base station whose propagation loss is a minimum.

Thus, transmission data control section 208 generates a control signal indicating that an dedicated traffic channel signal should be transmitted to base station (A) 102, and therefore data composition section 209 controls the timing of transmission data so that an dedicated traffic channel signal is transmitted to base station (A) 102 and at the same time spreading section 211 performs spreading processing so that an dedicated so traffic channel signal is transmitted to base station (A) 102.

As a result, as shown in FIG. 6B, mobile station 101 only transmits an dedicated traffic channel signal to base station (A) 102.

On the contrary, in the case where the propagation loss of base station (B) 103 is smaller than the propagation loss of base station (A) 102, propagation loss comparator 207 detects base station (B) 103 as the base station whose propagation loss is a minimum.

Thus, transmission data control section 208 generates a control signal indicating that an dedicated traffic channel signal should be transmitted to base station (B) 103, and therefore data composition section 209 controls the timing of transmission data so that an dedicated traffic channel signal is transmitted to base station (B) 103 and at the same time spreading section 211 performs spreading processing so that an dedicated traffic channel signal is transmitted to base station (B) 103.

As a result, as shown in FIG. 6C, mobile station 101 stops transmission of an dedicated traffic channel signal to base station (A) 102 and transmits an dedicated traffic channel signal only to base station (B) 103.

In this case (FIG. 6C), when mobile station 101 moves to area 106 of base station (B) 103 completely, base station (A) 102 or base station (B) 103 transmits a command for handover end to mobile station 101 and stops transmission of an dedicated traffic channel signal to mobile station 101. As a result, as shown in FIG. 6D, mobile station 101 only receives an dedicated traffic channel signal from base station (B) 103 and transmits an dedicated traffic channel signal only to base station (B) 103.

Then, the operation of the base station in execution of handover in the case where the mobile station equipped 20 with the transmission/reception apparatus according to this embodiment switches the base station to which an dedicated traffic channel signal should be transmitted based on the reception level of a common control channel signal from each base station during handover will be explained with reference to FIG. 4 and FIG. 6 again.

According to FIG. 4, after receiving an dedicated traffic channel signal from mobile station 101, base station (A) 102 and base station (B) 103 extract a demodulated signal by performing predetermined demodulation processing on the received signal. Moreover, each base station above performs CRC processing on the demodulated signal and thereby obtains information as to whether this demodulated signal block is wrong or not, that is, a CRC result. Furthermore, the base station above outputs a signal resulting from adding the above CRC result to the extracted demodulated signal to RNC (Radio Network Controller) 104.

RNC 104 compares the CRC result added to the signal transmitted from each base station and outputs the signal from the base station in which no error has occurred to a net, which is not shown in the figure.

This will be explained more specifically with reference to FIG. 6. In the case shown in FIG. 6B, mobile station 101 transmits an dedicated traffic channel signal to base station (A) 102 in TS302. Base station (A) 102 extracts the demodulated signal from the received dedicated traffic channel signal and outputs a signal resulting from adding the CRC result to this demodulated signal to RNC 104. On the other hand, base station (B) 103 receives no dedicated traffic channel signal from mobile station 101, and therefore the result of CRC processing for the demodulated signal is regarded as NG. Thus, base station (B) 103 transmits a predetermined signal with the CRC result regarded as NG added to RNC 104.

RNC 104 compares the CRC result added to the signal from base station (A) 102 and the CRC result added to the signal from base station (B) 103. Here, since the CRC result regarded as NG for the signal from base station (B) 103 is added to RNC 104, the signal from base station (A) 102 is selected by RNC 104. As a result, only the signal from base station (A) 102 is output to a net, which is not shown in the figure.

Then, in the case shown in FIG. 6C, mobile station 101 changes the transmission destination of an dedicated traffic signal from base station (A) 102 to base station (B) 103 based on a propagation loss calculated from the reception level of a common control channel signal from each base station. Base station (B) 103 extracts the demodulated signal from the dedicated traffic signal received from mobile station 101 and outputs a signal resulting from adding the CRC result to this demodulated signal to RNC 104. On the other hand, since base station (A) 102 has not received an dedicated traffic channel signal from mobile station 101, the result of CRC processing to the demodulated signal is regarded as NG. For this reason, base station (B) 103 transmits a predetermined signal with the CRC result regarded as NG added to RNC 104.

RNC 104 compares CRC results added to signals from the base stations. The RNC estimates only the signal from base station (B) 103 as the signal with no error. As a result, only the signal from base station (B) 103 is output to a net, which is not shown in the figure.

As shown above, mobile station 101 switches the transmission destination of an dedicated traffic channel signal from the propagation loss calculated based on the reception level of a common control channel signal during handover. RNC 104 compares the CRC results, and therefore can output an appropriate signal to the net. That is, even if each mobile station switches the transmission destination of the traffic channel during handover, each base station need not perform any special processing and RNC 104 can output an appropriate signal to the net.

As shown above, the transmission/reception apparatus according to this embodiment measures a propagation loss using a common control channel signal almost always transmitted from each base station (each party on the other end of communication), only transmits an dedicated traffic channel signal to the base station whose propagation loss is a minimum (base station whose propagation condition is optimal) in execution of handover and stops transmission of an dedicated traffic channel signal to other base stations. This can limit the time slots for transmission of dedicated traffic channel signals of the transmission/reception apparatus above to only one time slot, making it possible to suppress current consumption of the transmission/reception apparatus above and suppress interference with base stations other than those using the same time slot as that described above which is a communication target.

Furthermore, the transmission/reception apparatus according to this embodiment uses channels handled by a plurality of base stations during handover to receive dedicated traffic channel signals and uses channels handled by the base station whose propagation loss is a minimum to transmit an dedicated traffic channel signal, making it possible to suppress interruption of calls more than the case where conventional hard handover is used.

Furthermore, the transmission/reception apparatus according to this embodiment uses a TDD system for a communication with each base station. The TDD system provides a very high correlation between the uplink propagation path characteristic and downlink propagation path characteristic, resulting in a high correlation between the propagation condition when a base station transmits a common control channel to this transmission/reception apparatus and the propagation condition when this transmission/reception apparatus transmits an dedicated traffic channel signal to the base station above. Therefore, this transmission/reception apparatus only transmits an dedicated traffic channel signal to the base station whose propagation loss is a minimum during handover and thereby makes it possible to only transmit an dedicated traffic channel signal to the optimal base station, which takes account of instantaneous variations of the propagation condition from all base stations.

This embodiment describes the case where a common control channel signal is used to select the best transmission destination of an dedicated traffic channel signal, that is, the case where a common control channel signal is adopted as a signal to measure a propagation loss. However, the present invention is not limited to this, but it is also applicable to a case where other signals transmitted with constant power by each base station are used.

Furthermore, even in the case of the signal transmitted with intrinsic power by each base station to each mobile station equipped with the transmission/reception apparatus according to this embodiment, if that signal is a signal that the mobile station can estimate intrinsic power for each base station and estimate its propagation loss, the present invention is also applicable to a case using that signal to select the transmission destination of the optimal dedicated traffic channel signal.

For example, each base station may perform transmit power control specific to each mobile station for an dedicated traffic channel signal. Thus, it is impossible for each base station to simply select an optimal transmission destination of the dedicated traffic channel signal from the reception level of the dedicated traffic channel signal from each base station. However, the mobile station can estimate the propagation loss of an dedicated traffic channel signal for each base station if it is possible to estimate the transmission level of the dedicated traffic channel signal at each base station (method of using a command used for closed-loop transmit power control, etc.) in addition to the reception level of the dedicated traffic channel signal sent from each base station. In such a case, each mobile station can, therefore, decide the optimal transmission destination of an dedicated traffic channel signal (transmission destination with an optimal propagation condition) using an dedicated traffic channel signal from each base station.

Furthermore, this embodiment describes the case where only a CDMA system is used as the method of multiplexing signals at time slots in a frame, but the present invention is also applicable to a case where an OFDM system is used in addition to a CDMA system.

Furthermore, this embodiment describes the case where two base stations are involved in handover, but the present invention is not limited to this and is also applicable to cases where three or more base stations are involved in handover. In this case, it is possible to select a base station to which an dedicated traffic channel signal should be transmitted based on the propagation condition for each base station (e.g., propagation loss calculated from the reception level of a common control channel signal from each base station). It is also possible to select one base station as the base station to which an dedicated traffic channel signal should be transmitted and it is also possible to select two or more base stations according to the reception level of the common control channel signal.

(Embodiment 2)

This embodiment describes a case of Embodiment 1 where in execution of handover, an dedicated traffic channel signal is transmitted with a transmit power value determined with an open loop to a base station whose propagation loss calculated using a common control channel signal is a minimum.

Figure 7:
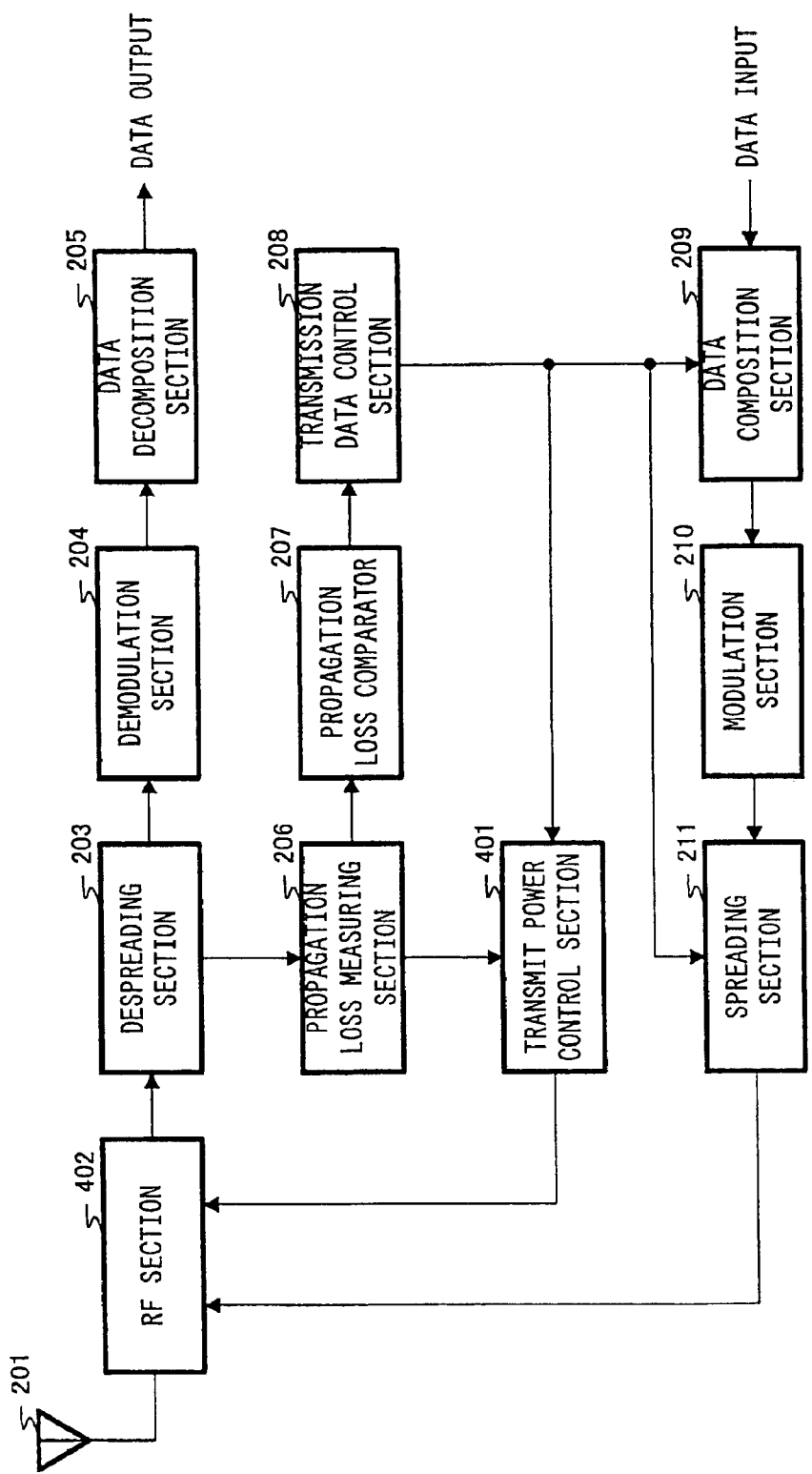
FIG. 7 is a block diagram showing a configuration of a mobile station equipped with a transmission/reception apparatus according to Embodiment 2, of the present invention.

Hereinafter, the transmission/reception apparatus according to this embodiment will be explained with reference to FIG. 7 taking the case where this transmission/reception apparatus is mounted in a mobile station as an example. FIG. 7 is a block diagram showing a configuration of a mobile station equipped with the transmission/reception apparatus according to Embodiment 2. The parts in FIG. 7 with the same configuration as that in Embodiment 1 (FIG. 5) are assigned the same reference numerals as those in FIG. 5 and their detailed explanations will be omitted. Only differences in FIG. 7 from Embodiment 1 (FIG. 5) will be focused and explained below.

According to FIG. 7, the control signal explained in Embodiment 1 is input to transmit power control section 401. That is, in execution of handover, a control signal indicating that an dedicated traffic channel signal should be transmitted to the base station whose propagation loss is a minimum is input to transmit power control section 401 and during a normal communication, a control signal indicating that an dedicated traffic channel signal should be transmitted to the base station which has been considered to be the transmission destination of an dedicated traffic channel signal so far is input. A propagation loss of each base station is input from propagation loss measuring section 206 to transmit power control section 401.

An optimal transmit power value is set to transmit power control section 401 with an open loop based on the propagation loss corresponding to the base station whose propagation loss is a minimum transmitted from propagation loss measuring section 206 for an dedicated traffic channel to the base station above not only during a normal communication but also during handover. That is, in the case, for example, where the propagation loss of the base station from propagation loss measuring section 206 is small, a small transmit power value of the dedicated traffic channel signal is set to the base station above and in the case where the propagation loss above is large, a large transmit power value is set. Information on the transmit power value is output to RF section 402.

During handover, RF section 402 only transmits an dedicated traffic channel signal to the base station whose propagation loss is a minimum with a transmit power value set based on the information above from transmit power control section 401.

Thus, the transmission/reception apparatus according to this embodiment measures a propagation loss using a common control channel signal almost always transmitted from each base station and transmits, in execution of handover, an dedicated traffic channel signal using a transmit power value set with an open loop based on the propagation loss above only to the base station whose propagation loss is a minimum and stops transmission of an dedicated traffic channel signal to other base stations.

Because of this, it is possible to limit time slots for transmission of an dedicated traffic channel signal of the transmission/reception apparatus above to one time slot, thus reducing current consumption of the transmission/reception apparatus above. Moreover, the transmission/reception apparatus according to this embodiment transmits an dedicated traffic channel signal with an appropriate transmit power value according to the propagation condition, thus making it possible to transmit an dedicated traffic channel signal with an appropriate transmit power value to an appropriate base station.

This embodiment describes the case where two base stations are involved in handover, but the present invention is not limited to this and is also applicable to cases where three or more base stations are involved in handover. In this case, it is possible to select a base station to which an dedicated traffic channel signal should be transmitted based on the propagation condition for each base station (e.g., propagation loss measured using a common control channel signal from each base station) and set a transmit power value of the dedicated traffic channel signal to the selected base station based on the propagation condition for the base station above. It is also possible to select one base station as the base station to which an dedicated traffic channel signal should be transmitted and it is also possible to select two or more base stations according to the reception level of a common control channel signal.

Furthermore, this embodiment describes the case where a common control channel signal is used as a signal to measure the propagation condition, but the present invention is not limited to this, and is also applicable to cases where another signal, for example, an dedicated traffic channel signal is used. In the case where an dedicated traffic channel signal is used as the signal to measure the propagation condition, it is possible to select a party on the other end of communication to which the dedicated traffic channel signal should be transmitted using the method explained in Embodiment 1 and transmit the dedicated traffic channel signal with a transmit power value set with an open loop using a propagation loss calculated from the transmission level of the dedicated traffic channel signal at this base station and the reception level in the transmission/reception apparatus according to this embodiment about this dedicated traffic channel signal to the selected base station. This makes it possible to transmit an dedicated traffic channel signal with an optimal power value to each base station.

The transmission/reception apparatus according to this invention can be mounted in a communication terminal apparatus in a digital radio communication system.

① The TDMA-TDD based transmission/reception apparatus of the present invention adopts a configuration comprising detector for detecting propagation conditions for a plurality of base stations which receive an dedicated traffic channel signal;

selector for selecting the base station with an optimal propagation condition from among the plurality of base stations as the transmission destination of the dedicated-traffic channel signal; and transmitter for transmitting the dedicated traffic channel signal only to the base station selected by said selector.

According to this configuration, the propagation conditions for a plurality of parties on the other end of communication which receive an dedicated traffic channel signal are detected and the dedicated traffic channel signal is only transmitted to the one from among the plurality of parties on the other end of communication whose propagation condition is optimal, thus making it possible to suppress current consumption and interference with parties on the other end of communication other than the communication target.

② The TDMA-TDD based transmission/reception apparatus of the present invention adopts a configuration with the detector detecting propagation conditions using the transmission level of common control channel signals by a plurality of base stations and the reception level of common control channel signals transmitted by the plurality of base stations.

According to this configuration, the common control channel signal is transmitted with constant power by a plurality of parties on the other end of communication, and therefore it is possible to accurately detect the propagation conditions for the plurality of parties on the other end of communication above from the transmission level of the broadcast common control channel signal above by measuring the reception level of the common channel signal above. This makes it possible to reliably transmit an dedicated traffic channel signal only to a party on the other end of communication with an optimal propagation condition.

③ The TDMA-TDD based transmission/reception apparatus of the present invention adopts a configuration with the detector detecting propagation conditions using the transmission level of dedicated traffic channel signals from a plurality of base stations and the reception level of dedicated traffic channel signals transmitted by the plurality of base stations.

According to this configuration, it is possible to correctly detect the propagation conditions for a plurality of parties on the other end of communication above by using the transmission level of the dedicated traffic channel signals at the plurality of parties on the other end of communication above and the reception level of dedicated traffic channel signals transmitted from the plurality of parties on the other end of communication above. This makes it possible to reliably transmit an dedicated traffic channel signal only to a party on the other end of communication with an optimal propagation condition.

④ The TDMA-TDD based transmission/reception apparatus of the present invention adopts a configuration with the transmitter transmitting an dedicated traffic channel signal with a transmit power value set with an open loop using the propagation condition from each base station to the base station selected by the selector.

According to this configuration, an dedicated traffic channel signal is transmitted with a transmit power value set with an open loop according to the propagation condition above to the party on the other end of communication selected as the transmission destination of the dedicated traffic channel assuming that its propagation condition is optimal, making it possible to transmit an dedicated traffic channel signal with an appropriate transmit power value to an appropriate party on the other end of communication.

⑤ The communication terminal apparatus of the present invention adopts a configuration comprising the TDMA-TDD based transmission/reception apparatus above.

According to this configuration, it is possible to provide a communication terminal apparatus carrying out optimal communications by mounting a transmission/reception apparatus capable of suppressing current consumption and interference with parties on the other end of communication other than the communication target and executing handover without causing any interruption of calls.

⑥ The base station of the present invention adopts a configuration carrying out a radio communication with a communication terminal apparatus equipped with the TDMA-TDD based transmission/reception apparatus above.

According to this configuration, it is possible to provide a base station carrying out optimal communications by carrying out a radio communication with a communication terminal apparatus equipped with a transmission/reception apparatus capable of suppressing current consumption and interference with parties on the other end of communication other than the communication target and executing handover without causing any interruption of calls.

(7) The TDMA-TDD based transmission/reception method of the present invention comprises detecting step of detecting propagation conditions for a plurality of base stations which receive an dedicated traffic channel signal;

selecting step of selecting the base station with an optimal propagation condition from among the plurality of base stations as the transmission destination of the dedicated traffic channel signal; and transmitting step of transmitting the dedicated traffic channel signal only to the base station selected by said selecting step.

According to this method, the propagation conditions for a plurality of parties on the other end of communication which receive an dedicated traffic channel signal is detected and the dedicated traffic channel signal is only transmitted to the party on the other end of communication whose propagation condition is optimal, thus making it possible to suppress current consumption and interference with parties on the other end of communication other than the communication target.

As described above, the present invention selects the base station to be the transmission destination from among a plurality of base stations in the process of handover based on the propagation conditions for the plurality of base stations and transmits a signal only to the selected base station, thus making it possible to provide a transmission/reception apparatus capable of suppressing current consumption and interference with base stations other than the communication target and executing handover without causing any interruption of calls.

The present invention is not limited to the above described embodiments, and various variations and modifications may be possible without departing from the scope of the present invention.

This application is based on the Japanese Patent Application No. HEI 11-309229 filed on Oct. 29, 1999, entire content of which is expressly incorporated by reference herein.

What is claimed is:

1. A TDMA-TDD based transmission/reception apparatus mounted in a mobile station and transmitting and receiving signals by providing a downlink traffic slot and an uplink traffic slot alternately in a traffic frame, the transmission/reception apparatus comprising:

a detector that receives signals transmitted from a plurality of base stations in a traffic frame during a handover, and, based on these signals, detects propagation conditions with the plurality of base stations respectively;

a selector that, based on detection results of the propagation conditions, selects a base station corresponding to an optimal propagation condition from among the plurality of base stations; and a transmitter that assigns an uplink slot only to the selected base station in a same traffic frame in which the signals from the plurality of base stations are received during the handover and transmits a dedicated traffic channel signal only to the selected base station.

2. The TDMA-TDD based transmission/reception apparatus according to claim 1, wherein the detector detects the propagation conditions using the transmission levels of common control channel signals communicated by the plurality of base stations and the reception levels of the common control channel signals transmitted by the plurality of base stations.

3. The TDMA-TDD based transmission/reception apparatus according to claim 1, wherein the detector detects the propagation conditions using the transmission levels of dedicated traffic channel signals from the plurality of base stations and the reception levels of the dedicated traffic channel signals transmitted by the plurality of base stations.

4. The TDMA-TDD based transmission/reception apparatus according to claim 1, wherein the transmitter transmits the dedicated traffic channel signal to the selected base station using a transmit power value set with an open loop and based upon the propagation condition detected for the selected base station.

5. A TDMA-TDD based transmission/reception method in a mobile station, the method comprising:

receiving signals transmitted from a plurality of base stations in a traffic frame during a handover, and, based on these signals, detecting propagation conditions with the plurality of base stations respectively;

selecting a base station corresponding to an optimal propagation condition from among the plurality of base stations based on detection results of the propagation conditions; and assigning an uplink slot only to the selected base station in a same traffic frame in which the signals from the plurality of base stations are received during the handover; and transmitting a dedicated traffic channel signal only to said selected base station.

6. A base station that carries out a radio communication with a TDMA-TDD based transmission/reception apparatus mounted in a mobile station and transmitting and receiving signals by providing a downlink traffic slot and an uplink traffic slot alternately in a traffic frame, the transmission/reception apparatus comprising:

a detector that receives signals transmitted from a plurality of base stations in a traffic frame during a handover, and, based on these signals, detects propagation conditions with the plurality of base stations respectively;

a selector that, based on detection results of the propagation conditions, selects a base station corresponding to an optimal propagation condition from among the plurality of base stations; and a transmitter that assigns an uplink slot only to the selected base station in a same traffic frame in which the signals from the plurality of base stations are received during the handover and transmits a dedicated traffic channel signal only to the selected base station.

* * * * *